United States Patent [19]
Arpee et al.

[11] Patent Number: 5,970,394
[45] Date of Patent: Oct. 19, 1999

[54] METHOD OF DETECTING DAMAGED CELLULAR TELEPHONE FACILITIES

[75] Inventors: John E. Arpee; Eric H. Jensen, both of Herndon, Va.

[73] Assignee: Internet Mobility Corporation, Herndon, Va.

[21] Appl. No.: 08/957,258

[22] Filed: Oct. 24, 1997

[51] Int. Cl.$^6$ ........................ H04Q 7/20
[52] U.S. Cl. .............. 455/67.1; 455/67.6; 455/423; 455/504
[58] Field of Search ................ 455/403, 422, 455/423, 424, 425, 432, 434, 435, 504, 506, 515, 522, 67.1, 67.6, 226.2; 379/1, 27, 29; 375/224, 227, 346, 285

[56] References Cited

U.S. PATENT DOCUMENTS

| | | | |
|---|---|---|---|
| 4,893,347 | 1/1990 | Eastmond et al. | 455/506 |
| 5,577,265 | 11/1996 | Wheatley, III | 455/506 |
| 5,634,206 | 5/1997 | Reed et al. | 455/504 |
| 5,872,775 | 2/1999 | Saints et al. | 455/67.1 |
| 5,878,328 | 3/1999 | Chawala et al. | 455/67.1 |
| 5,879,397 | 2/1999 | Sasin et al. | 455/67.1 |

*Primary Examiner*—William G. Trost
*Assistant Examiner*—Nay Maung
*Attorney, Agent, or Firm*—Stephen L. King

[57] ABSTRACT

A method for detecting inequality in path balance in a cellular telephone system including the steps of providing data describing measured signal strength of signals received at a mobile unit and at a cell site in the absence of interference at a plurality of points describing the entire system; providing data describing measured signal strength of signals transmitted from each cell and from the mobile unit in the cellular telephone system; accumulating and averaging the data describing measured signal strength of signals received at the mobile unit and at the cell site to eliminate path loss variances between points and the cell site; selecting data describing measured signal strength of signals received at a mobile unit with path loss variances eliminated, data describing measured signal strength of signals transmitted from the mobile unit, data describing measured signal strength of signals received at a cell with path loss variances eliminated, data describing signal strength of signals transmitted from each cell for each point of the system; utilizing the selected data for each point to provide measures of the difference between the strength of signals on each path between each point and each cell; comparing the difference on each path between a point and a cell to other differences between the point and the cell; and changing cell characteristics where a difference on any path between a point and a cell is significantly different than any other difference between the point and the cell.

9 Claims, 3 Drawing Sheets

METHOD OF DETECTING DAMAGED CELLULAR TELEPHONE FACILITIES

BACKGROUND OF THE INVENTION

1. Field of the Invention

This invention relates to cellular telephone systems and, more particularly, to processes for detecting facilities which are providing degraded performance in cellular telephone systems.

2. History of the Prior Art

Presently available commercial mobile communication systems typically include a plurality of fixed base stations (cells) each of which transmits signals to and receives signals from mobile units within its communication area. Each base station is assigned a plurality of channels over which it can communicate with mobile units. A mobile unit within range of the base station communicates with the external world through the base station using these channels. Typically, the channels used by a base station are separated from one another in some manner sufficiently that signals on any channel do not interfere with signals on another channel used by that base station. To accomplish this, an operator typically allots to a base station a group of channels each of which is widely separated from the next. So long as a mobile unit is within the area in which the signal from a base station is strong enough and is communicating with only that base station, there is no interference with the communication.

In order to allow mobile units to transmit and receive telephone communications as the units travel over a wide geographic area, each cell is normally physically positioned so that its area of coverage is adjacent to and overlaps the areas of coverage of a number of other cells. When a mobile unit moves from an area covered by one base station to an area covered by another base station, communications with the mobile unit are transferred (handed off) from one base station to another in an area where the coverage from the adjoining cells overlaps. Because of this overlapping coverage, the channels allotted to the individual cells are carefully selected so that adjoining cells do not transmit or receive on the same channels. The channels used by adjoining base stations are also theoretically separated from the channels of each adjoining base station sufficiently that signals from any base station do not interfere with signals from another adjoining base station. This separation is typically accomplished by assigning a group of widely separated non-interfering channels to some central cell and then assigning other groups of widely separated non-interfering channels to the cells surrounding that central cell using a pattern which does not reuse the same channels for the cells surrounding the central cell. The pattern of channel assignments continues similarly with the other cells adjoining the first group of cells. The pattern is often called a channel reuse pattern.

There are a number of different types of mobile communications systems. Channels are defined in different manners in each of the different systems. In the most prevalent American Mobile Phone System (AMPS) system, channels are defined by frequency. A frequency band of 25 MHz providing approximately four hundred different adjoining FM frequency channels is allotted by the federal government to each cellular operator. In a typical AMPS system, each channel uses a fixed FM frequency band width of 30 KHz. for downlink transmission from a base station to a mobile unit and another fixed FM frequency band width of 30 KHz. for uplink transmission from a mobile unit to a cell. Typically, the frequencies assigned to the downlink transmissions for an entire cellular system immediately adjoin one another and are widely separated from the frequencies assigned to the uplink transmissions which also immediately adjoin one another.

Since channels are defined by frequency in an AMPS system, an operator typically allots to any single base station a set of channels with frequencies which are each separated from one another sufficiently to eliminate interference between those channels. In some AMPS systems, especially those with cells in urban areas carrying heavy traffic, each cell may be further divided into two or three sectors each of which may include channels having the above-described frequency allotment of channels. The antennas of each sector are typically arranged to provide 120 degree coverage. When cells are discussed herein, sectors are normally meant as well unless the context indicates otherwise.

Although the channels allotted to the individual cells are carefully selected so that adjoining cells do not transmit or receive on the same frequencies, it is very difficult to eliminate all interference in a system where channels are based on differences in frequencies. Antenna patterns, power levels, scattering, and wave diffraction differ from cell to cell. Buildings, various other structures, hills, mountains, foliage, and other physical objects cause signal strength to vary over the region covered by a cell. Consequently, the boundaries at which the signal strength of a channel falls below a level sufficient to support communications with a mobile unit vary widely within a cell and from cell to cell. For this reason, cells adjacent one another do not, in fact, typically form precise geometric boundaries. Because the boundaries of cells are imprecisely defined, signals will often interfere with one another even though they are generated by cells which are at distances theoretically sufficient to eliminate interference. This is especially true when a sectored cell pattern is used because the cells are much closer to one another than in a simple cell pattern.

Because of this interference, other types of mobile systems have been devised.

In one type of mobile system called Code Division Multiple Access (CDMA) digital signals are used to transmit data. All of the base stations of a CDMA system use the same "spread spectrum" frequency band of 1.25 megacycles to transmit the digital signals. The transmissions are combined with redundant channel coding information to allow error correction. The encoded signals are then multiplied by one of sixty-four Walsh codes which establish individual channels and increase the bandwidth to 1.25 megacycles. Because of the redundancy of the encoded signals, a receiver may decode a signal from the plethora of coded channels carrying data on the broad frequency band. Since the Walsh codes establish a number of individual channels and the pseudo-noise code assigned to each base station differs from those of other surrounding base stations, adjacent and remote cells may reuse the same frequency bands.

In another common type of mobile system called Time Division Multiple Access (TDMA), frequencies are assigned to the entire system in groups much like those of an AMPS system. However, within any frequency, each base station sends and receives in bursts during some number of different intervals or time slots. These time intervals within frequency bands then effectively constitute the individual channels. By assuring that the group of frequencies assigned to any individual base station differ from one another and from the frequencies assigned to base stations surrounding each individual base station, a channel reuse pattern is established which allows substantially greater use of the frequency spectrum because of the time division process.

In theory, these forms of cell arrangement and channel assignments allows channel reuse patterns to be repeated at distances separated sufficiently to negate interference between mobile units on the same and adjacent channels. They also allow signals used by the different cells in a particular system to be strong enough to provide complete coverage of the system area. In fact, interference and insufficient coverage do occur.

One reason that interference and insufficient coverage occur in the various mobile systems is that the various components of the system deteriorate or fail in some way so that cells operate at less than optimum. This may reduce the signal strength provided by certain cells thereby changing the patterns from those originally planned for the system. Such pattern changes reduce coverage in some areas and may cause undesired overlap of signals from remote cells. Component failures may be rapid or slow. Antennas are often physically damaged. This can cause a lower level response or actually shift the antenna pattern. Connections loosen or otherwise become less than optimum so that lower levels of current are transferred. Any number of other causes may affect the level at which a cell transmits, the direction of that transmission, or other characteristics of the transmission. When a cell is transmitting or receiving at less than optimum, the tolerances expected in the system may no longer exist thereby causing spurious signals to reach the same level as desired signals.

Isolating a cell which is experiencing reduced functionality is very difficult because of the interaction of the signals over an entire cellular system. Heretofore, it has been necessary to physically visit and inspect each cell which might provide signals to an area where difficulty is being experienced in order to determine whether damage has occurred to the components of the individual cells. Such visits require the physical inspection of the cell components and the measurement of the various characteristics of the cell. Usually the measurement of the various characteristics of the cell must be performed by a skilled technician. Testing a system to determine what is causing interference or coverage reduction is extremely labor intensive and time consuming. Testing a system is consequently expensive.

It is desirable to provide a process by which the deterioration and failure of components of cells in a mobile telephone system may be detected rapidly, inexpensively, and without the investment of substantial amounts of expensive labor.

SUMMARY OF THE INVENTION

The present invention is realized by a process which logs the strength of transmitted and received signals communicated over a plurality of paths between a base station and a particular mobile unit position, determines whether the transmitted and received signal strengths over any particular path between the base station and the mobile unit position differ from those over the other paths, and selects only those cells in which transmitted and received signal strengths over one of the paths differs from those transmitted on other paths for physical inspection and testing.

These and other features of the invention will be better understood by reference to the detailed description which follows taken together with the drawings in which like elements are referred to by like designations throughout the several views.

DETAILED DESCRIPTION

Figure 1:
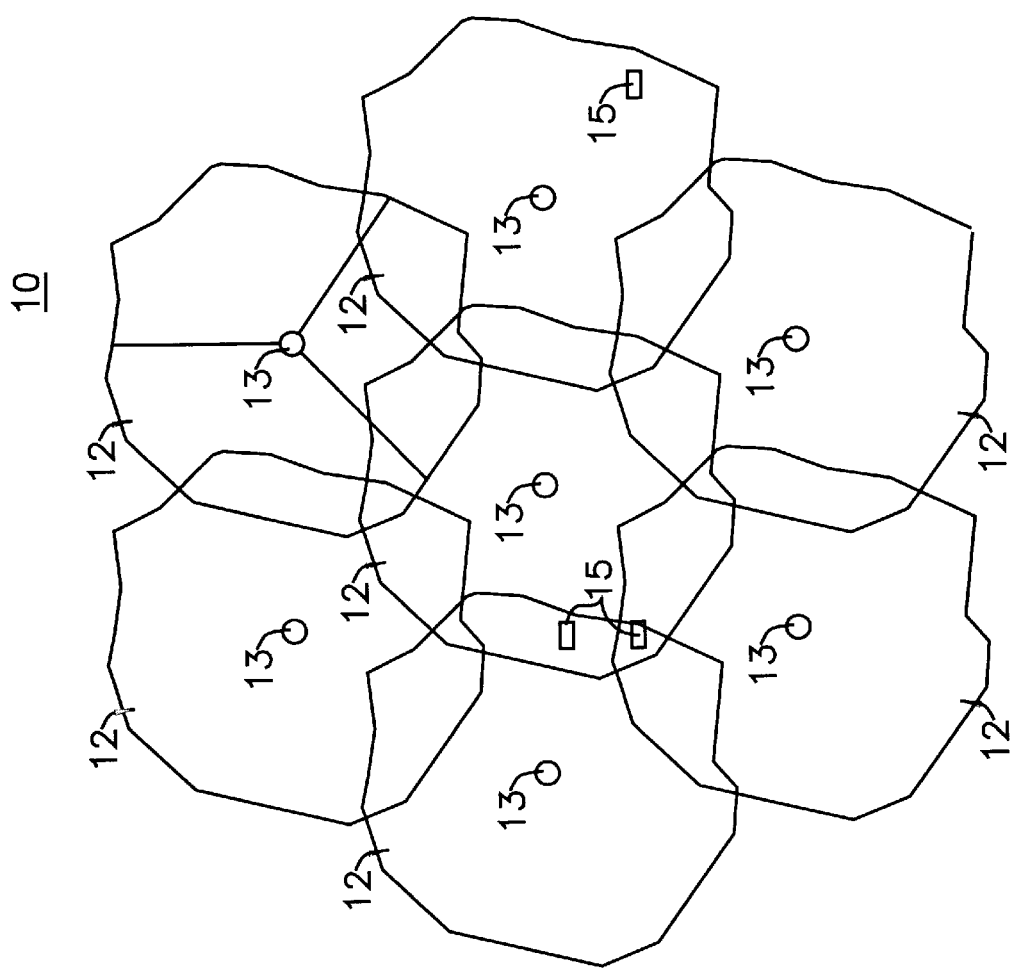
FIG. 1 is a drawing depicting a portion of a mobile cellular telecommunications system.
Figure 2:
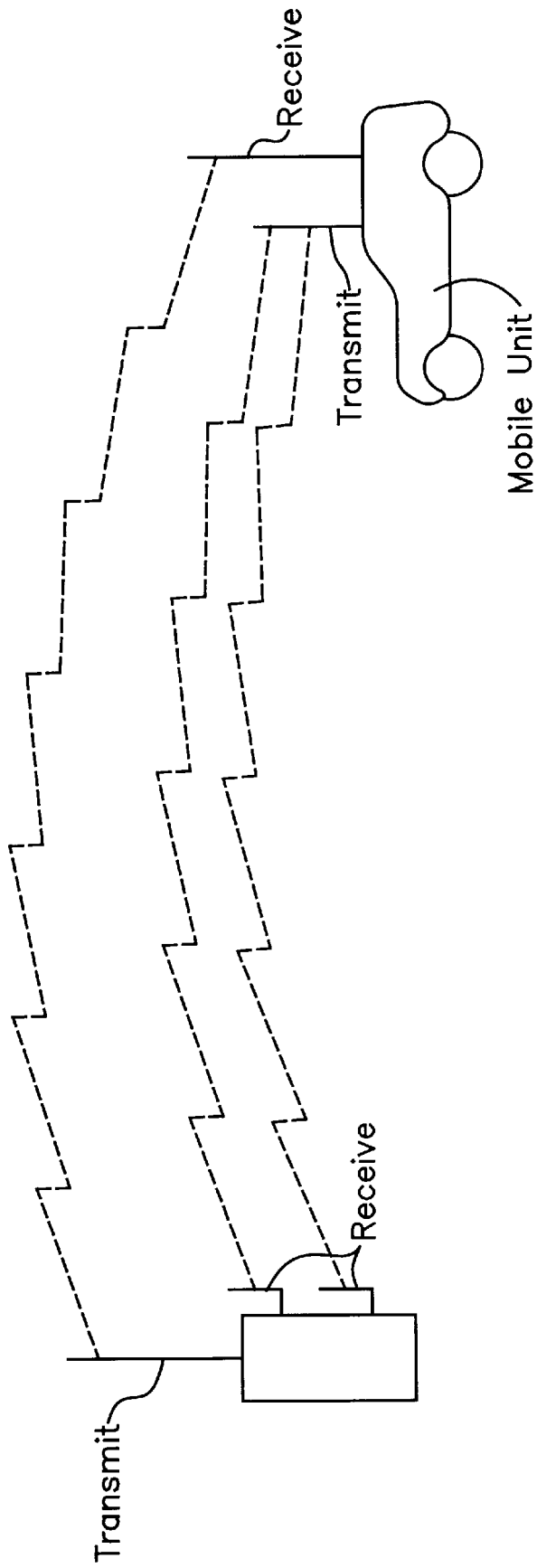
FIG. 2 is a view illustrating the transmission of signals between a base station and a mobile unit in a mobile cellular telecommunications system.

Referring now to FIG. 1, there is illustrated a cellular telephone system 10 which includes a number of individual cells 12 arranged in a basically honeycomb pattern. For the purpose of this explanation of the invention, the system 10 will be considered to be an AMPS system. This invention may be practiced, however, with any of the known cellular systems including CDMA and TDMA systems. Each of the cells 12 includes at least one base station 13 which transmits and receives communications on a number of assigned channels (frequencies in an AMPS system) with mobile units 15 operating within its service area. The channels which are chosen are separated sufficiently that signals from any base station do not interfere with other signals from that base station. In FIG. 1, the service area of the each cell 12 is defined by an outer solid boundary which indicates the limits of the area in which the signals from that cell 12 are strong enough to serve a mobile unit 15.

As may be seen in FIG. 1, in order to allow mobile units to transmit and receive telephone communications over a wide area, the service area of each cell 12 overlaps the service areas of a number of surrounding cells 12 so that within these overlapping areas either of two or more cells 12 might serve a mobile unit 15. The channels allotted to the individual cells and the channel reuse pattern are carefully selected so that adjoining cells do not transmit or receive on the same channels in these overlapping areas over an entire cellular system.

In some arrangements (not shown in FIG. 1), especially cells used in urban areas carrying heavy traffic, each cell 12 is further divided into sectors each of which may include channels allotted as described earlier. The antennas of each sector may be arranged to provide 120 degree coverage. With slightly over four hundred channels available to each AMPS cellular system, this allows a repeating pattern of groups of cells in the beehive arrangement of FIG. 1 with seven cells each having three sectors each of which has approximately twenty channels.

Unfortunately, the boundaries at which the signal strength of a channel falls below a level sufficient to support communications with a mobile unit vary widely from cell to cell. For this reason, cells adjacent one another do not, in fact, typically form a precise geometric boundaries suggested above but form boundary patterns such as those illustrated in FIG. 1.

In an AMPS system, each of the cells 12 usually includes one transmitting antenna and two receiving antennas. Two receiving antennas are used in order to enhance the ability of the cell to receive signals from a mobile unit even in the face of local fading. This local fading is called Rayleigh fading and is caused by reflections of various transmitted signals and the original signals beating against one another to either enhance or diminish the signals received at an antenna. By using a pair of receiving antennas, if a signal is reduced at one antenna, it is probably not reduced at the other antenna.

If individual cell characteristics have deteriorated, then the area covered by a cell may be reduced producing points at which no signals are received. Determining whether the individual characteristics of cells have deteriorated to the point at which signal strength is significantly affected usually requires that a service technician visit the cell site. There, the technician must determine whether any of the cell components have changed physically and test various characteristics of the cell to determine whether those characteristics have deteriorated. As pointed out, this process is slow, labor intensive, and expensive.

A method has now been devised which overcomes the problems of the prior art by utilizing measured signal level data which is readily and inexpensively available to determine cell component deterioration The process allows the discovery of cells whose characteristics have deteriorated without the need to visit the cells themselves. If any cells are determined to have deteriorated significantly, these few cells may be visited by a technician and their problems corrected. The process eliminates a substantial portion of the expense of correcting deterioration in a cellular system.

The provision of three antennas provides a basis for the present invention. It is an axiom of transmission theory that the characteristics of a signal path from a transmitting antenna at a first point to a receiving antenna at a second point are the same as the characteristics of the signal path if the positions of the transmitter and receiver are exchanged. Thus, theoretically, the strengths of signals transmitted on each of the paths between a mobile unit and a cell should be identical if the transmitted signal strengths are the same.

Each of the receiving antennas receives the same signals emanating from the same mobile unit antenna. Consequently, signals over the two paths should be statistically identical. Similarly, when the level of signals transmitted by a base station is correctly adjusted, it should provide a signal of a particular strength at the mobile unit. This strength should be directly proportional to the strength of the signals received at the base station.

Prior art practitioners have considered this to be an interesting laboratory phenomenon but without value for field use. Measurements which are taken in the field are not considered to be sufficiently reliable to allow the application of this theoretical postulate for a number of reasons. The presence of Rayleigh fading has made any measurement suspect. This has been true even though two paths are provided for receiving signals at the base station since the variations encountered are so great that one receiving antenna may often be receiving a strong signal while the other receives essentially none. Any attempt to utilize such signals for comparisons has been considered ridiculous. Moreover, it is generally true that the transmitter utilized at a base station is significantly more powerful than is the transmitter used by a mobile unit so that transmitted signal strengths are not the same. In addition, the determination of which signals are emanating from a particular cell has been very difficult because of the unusual antenna patterns encountered in actual systems. Consequently, field measurements have not been considered to provide valid information regarding cell site faults.

We have now discovered a method for eliminating these variables so that the accurate and reliable measurements may be taken from which those base stations which need repair may be discovered without the need to visit the cell sites. Moreover, the method we have devised to determine whether cell site visits are necessary allows readings to be taken utilizing essentially unskilled and inexpensive labor.

In order to understand the process of the present invention, it is useful to consider the factors which determine received signal strength. The strength of a signal received is equal to the strength of a signal injected at a transmitter plus the effect of any transmitter amplification less any path loss plus any receiver amplification.

Since systems are set up to utilize constant signal strengths on control channels, the transmitter and receiver amplifications are fixed and the amplification can be controlled so that the desired amplification is a known factor at setup of a base station. With amplification a known factor, the amplification values in the equation may be considered to be equivalent along any of the three paths between a cell site and a mobile unit.

This means that path loss is the only thing which may differ along any of the three paths between a cell site and a mobile unit. Path loss consists of three factors, loss with distance from the transmitting antenna, diffraction loss and loss due to Rayleigh fading. Path loss with distance from the transmitting antenna and diffraction loss are the same for transmissions on frequencies which are within approximately ten percent of one another. Consequently, the effect of Rayleigh fading is the only difference between two transmissions along essentially the same path between two positions.

Because Rayleigh fading causes both enhancement and dilution of transmitted signals in essentially equal amounts on an average, the effect of Rayleigh fading may be eliminated by taking a sufficient number of signal strength readings close to any particular point in the area of coverage of a cell and averaging the values. In one embodiment, each data sample is combined with other data samples within one hundred feet of each other to eliminate the effect of Rayleigh fading.

By using these assumptions, the inventive process has eliminated two of the uncertainties in determining accurate values of received signal strengths.

Consequently, if transmitted signal strength and received signal strength are known along two of the paths, if the amplifications are considered to be constants because presumably set to be constants, and if the effects of Rayleigh fading are eliminated, then the difference between signal strength of the transmitted and the received signals on each path should be the same. If the difference between signal strength of the transmitted and the received signals on each path is significantly different, then a particular cell requires physical assessment. If the signal strength of the transmitted and the two received signals differ, the facilities servicing one of the paths have deteriorated and should be corrected.

In order to determine transmitted signal strength and received signal strength along two of the paths, a test system is provided which includes a typical mobile transceiver connected to circuitry which records the strength of both received and transmitted signals and the time and position at which each signal is received or transmitted. The strength of signals generated by the mobile transmitter may be measured accurately before any test is commenced. Once adjusted, such a unit may be operated by a relatively unskilled driver who simply transmits and receives as with any mobile unit. The recording equipment utilized is well known in the art. For example, a GPS or Loran positioning system may be associated with the mobile equipment to provide input to a computer in the mobile testing unit. The computer accomplishes the recording of data and provides accurate timing information.

In addition, each of the cell sites being tested may be limited to one distinct channel each so that each cell may be readily identified. The individual channels assigned to each cell for the test can be selected so that there is no interference from any other cell since only one channel is used per cell.

Other possibilities includes the use of signals on separate control signal channels which utilize the same transmitters and receivers.

If a driver drives a limited area of the system at which problems have been encountered and both transmits to and receives from suspected cells in that area, then the transmitted and received strengths of signals at the mobile unit are known at each position. By taking a number of readings at closely associated positions the effect of Rayleigh fading may be averaged and eliminated for each position of the mobile unit.

At the same time, transmissions from the mobile unit may be sent and received by the two antennas of each cell site, the strength of those received signals recorded at the cell site, and the time logged for both the transmission by the mobile unit and receipt of those signals at the cell site. As a part of the hand off procedure utilized by present day cellular communication systems, received signal strength is measured in order to determine whether any stronger signals exist at a cell site to which a particular mobile unit should be handed. Consequently, this data is readily available.

Thus, there are available a transmitted signal strength at a mobile antenna, a received signal strength at the mobile unit, and two received signal strengths at the two cell receiving antennas which may be obtained without visiting any cell site and from which Rayleigh fading may be eliminated by averaging. By comparing these values to see if there are significant differences, cell sites with problems in receiving antenna paths may be determined without visiting the sites.

Moreover, since the cellular system has been established with each cell having its transmitter set to transfer signals at a prescribed strength, this prescribed transmission strength may be assumed. Then, the difference in the presumed transmitted signal strength at the cell cite and the received signal strength at the mobile unit may be assumed and compared to the other measured differences. This determines whether a problem exists with respect to the transmission path at the cell site.

Figure 3:
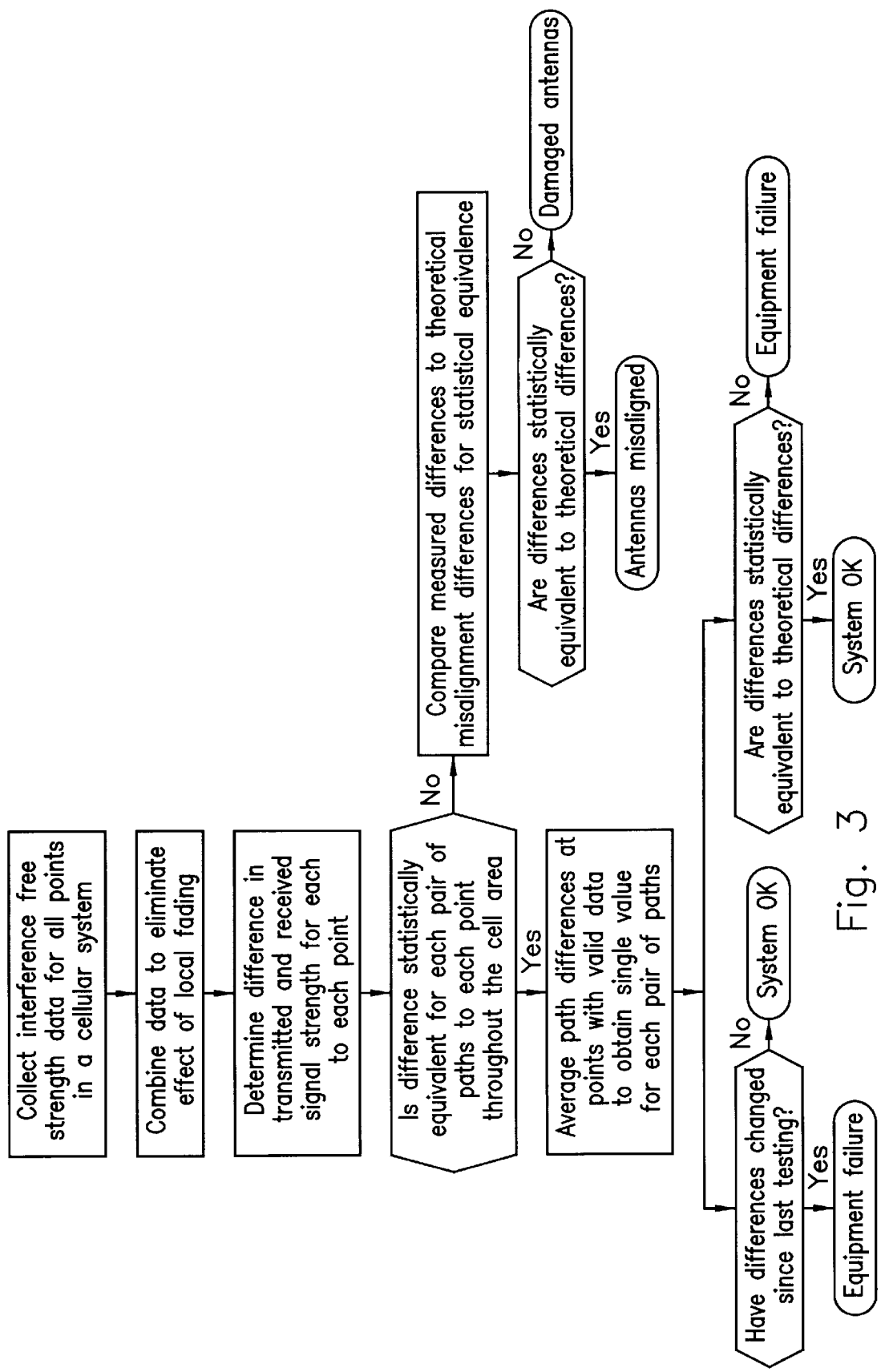
FIG. 3 is a flow chart illustrating a portion of a process in accordance with the present invention in a system such as that illustrated in FIG. 1.

In fact, all of the differences along any of the paths may be compared to the differences along any of the other paths from the cell and a particular point in order to better isolate that element of the system which is experiencing difficulty. Such a comparison is described in detail in FIG. 3 and in the description herein.

Moreover, by comparing the manner in which the differences in which the transmitted signal strength at a mobile antenna and the two received signal strengths vary, the type of problem may also be discovered in some situations. For example, since position is needed in order to compare readings, position may be used in order to determine angle differences from a cell site at which signals are received by a mobile unit. This allows comparisons of different points and a single cell to be taken. Then, if transmitted and received signal differences vary so that the differences are low at one angle and high at a different angle, then the antennas are probably misaligned. On the other hand, if transmitted and received signal differences do not vary between locations but do vary at one particular location, then one of the antennas is probably obscured. Other differences may indicate similar disparities caused by cell deterioration.

The results of the comparisons may also be used for other purposes. For example, when new antennas are installed to replace antennas which have deteriorated, a comparison of data provided from drive tests for the new antenna (properly adjusted to take account of differences in the antennas) with similar data taken when the antenna which has been replaced was operating properly will often show that the installation of the new antenna has been made incorrectly. Similarly, deterioration of an antenna over a period of time may be detected by comparing present data with similar data taken for the same antenna when the antenna was known to be operating properly.

Another use for the method of the present invention is to use the result of a comparison to accomplish "path balancing." Path balancing is normally used when antennas are set up in order to make sure that both receiving antennas are operating in the same manner (are balanced) and that the transmitting antenna is functioning at a proper proportion of the level of the receiving antennas. Normally, path balancing is accomplished by adjusting various system parameters including the levels at which hand-off occurs for a particular antenna. The comparison of the present method makes these adjustments easy to accomplish without requiring visits to a cell. The differences on the paths from a point to the receiving antennas at a cell are compared to the difference on the path from the cell and the point. If the new antennas provides different difference, the parameters may be adjusted to balance the antennas.

An additional use of the present method is to determine whether a particular channel is matched to any particular antenna. If the comparisons provide significantly different values for one channel than for other channels at any particular cell, then the channel may be degraded. This requires that more than one channel be used for transmitting and receiving signals at a particular cell in contrast to the other uses of the invention. A detected variation points to a channel failure for which the channel components should be checked. Alternatively, if the signal levels for a channel better match those of channels for another sector at the cell than those of the sector to which the channel is connected, then the antenna may be improperly connected and should be switched to an antenna of another sector at the particular cell. This sometimes happens when new channels are established at a cell having a plurality of sectors with antennas for each sector. A technician will inadvertently connect a channel to an incorrect one of the antennas.

In a preferred embodiment, the process is even simpler and requires only comparison of data already collected. For example, a technique for determining where new cell sites are to be placed utilizes essentially the same data as is utilized by the present invention. In that process, a drive test of at least a significant portion of the entire cellular system area is conducted. In the drive test, each cell and sector transmits on a single channel different than any channel used for transmission by any other cell or sector in the area. In general, signals on all channels transmitted from any one cell are, on an average, received at the same strength at any given point in the service area so long as the frequencies of the channels are within approximately ten percent of each other. Thus, whatever channel a cell transmits on during the tests, the received signal strength will be the same for signals transmitted on any other channel from that cell.

In such testing, test transceivers may be placed at proposed cell site positions. If a cellular system already exists, then the cell sites which exist are used along with any proposed new cell sites. A mobile unit with a scanning receiver drives over all of the roads and highways of the entire system. The mobile scanning receiver constantly scans and measures the strength (usually received signal power) of each test channel transmitted from each of the cell sites as the mobile unit moves. The mobile unit also includes equipment which constantly records the position of the mobile unit as each set of strength measurements is taken. This provides strength measurements of frequencies generated by transmitters at all of the cell sites proposed to be included in the system which can be received at each point in the service area over which the mobile unit drives. By transmitting from each cell on a single different channel, the cell which is transmitting any signal received at any point by the mobile unit is positively known. Moreover, the individual channels assigned to each cell for the test can be selected to provide no interference from any other cell since only one channel is used per cell. As the test continues, the signal strength measurements of the signals received are recorded in a database by equipment in the mobile unit together with the position at which the signals were received.

The frequency of each piece of signal strength data in the database is then related to the test channel being transmitted by each cell and sector during the test. This generates a database which indicates the cell and sector from which each signal received by the mobile unit was sent. The cellular strength data base thus includes actual, rather than projected, received signal strengths at each point in the test area for signals transmitted from each cell.

It should be noted that the signal strength data for an area can be compiled from more than a single drive test. In such a case, the data from all of the drive tests must be combined so that the data of each drive test matches that of other drive tests. Thus, for example, if higher transmission power was used in one drive test than in another, then the strength values should be scaled to provide data having the same significance. The data collected from one drive test may also be "combined" with previously collected data from other drive tests if the new data represents only a portion of the cells in the network.

Once the data is available, however it has been collected, the process compares the data for each antenna regarding transmitted and received signal strength in the manner described above. Thus, if data from a recent test of the above-described type is available, no additional labor need be invested other than in that needed to manipulate the data to determine which cell sites should be visited.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for detecting inequality in path balance in a cellular telephone system comprising the steps of:

providing data describing measured signal strength of signals received at a mobile unit and at a cell site in the absence of interference at a plurality of points describing the entire system;

providing data describing measured signal strength of signals transmitted from each cell and from the mobile unit in the cellular telephone system;

accumulating and averaging the data describing measured signal strength of signals received at the mobile unit and the cell site to eliminate path loss variances between points and the cell site;

selecting data describing measured signal strength of signals received at a mobile unit with path loss variances eliminated, data describing measured signal strength of signals transmitted from the mobile unit, data describing measured signal strength of signals received at a cell with path loss variances eliminated, data describing signal strength of signals transmitted from each cell for each point of the system;

utilizing the selected data for each point to provide measures of the difference between the strength of signals on each path between each point and each cell;

comparing the difference on each path between a point and a cell to other differences between the point and the cell; and changing cell characteristics where a difference on any path between a point and a cell is significantly different than any other difference between the point and the cell.

2. A method as claimed in claim 1 in which the step of changing cell characteristics comprises generating a signal to indicate that the characteristics of a particular cell have deteriorated so that service is required.

3. A method as claimed in claim 1 in which the step of changing cell characteristics comprises comparing strengths of signals received on two receiving antennas at a cell to determine variation of signal strength with angle from the cell, and indicating antenna misalignment if significant angular difference is detected.

4. A method as claimed in claim 1 in which the step of changing cell characteristics comprises modifying system parameters to eliminate any difference.

5. A method as claimed in claim 4 in which the step of modifying system parameters comprises modifying handoff characteristics to negate any difference.

6. A method as claimed in claim 1 in which the step of changing cell characteristics comprises isolating the path providing different values than other paths, and changing cell characteristics of an isolated path.

7. A method as claimed in claim 1 in which the step of comparing the difference on each path between a point and a cell to each other difference between the point and the cell includes comparing the difference on each path between a point and a cell to the difference between the same point and the cell at a time when the path was functioning correctly.

8. A method as claimed in claim 1 in which the step of comparing the difference on each path between a point and a cell to each other difference between the point and the cell includes comparing the difference on each path between a point and a cell on one channel to the difference between the same point and the cell on another channel.

9. A method as claimed in claim 1 in which the step of comparing the difference on each path between a point and a cell to each other difference between the point and the cell includes comparing the difference on each path between a point and a cell on one channel to the difference between the same point and the cell on a plurality of other channels, and the step of changing cell characteristics comprises switching the channel to a different sector if the differences are significant.

* * * * *